United States Patent
Jung et al.

(10) Patent No.: US 9,930,268 B2
(45) Date of Patent: Mar. 27, 2018

(54) METHOD AND APPARATUS FOR DISPLAYING AN IMAGE SURROUNDING A VIDEO IMAGE

(71) Applicant: SAMSUNG ELECTRONICS CO., LTD., Suwon-si (KR)

(72) Inventors: Min-kyu Jung, Seoul (KR); Seong-hoon Kang, Suwon-si (KR); Hark-joon Kim, Ansan-si (KR); Sung-wook Baek, Suwon-si (KR); Sung-bin Kuk, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 14/262,118

(22) Filed: Apr. 25, 2014

(65) Prior Publication Data

US 2014/0320745 A1    Oct. 30, 2014

Related U.S. Application Data

(60) Provisional application No. 61/815,930, filed on Apr. 25, 2013.

(30) Foreign Application Priority Data

Sep. 4, 2013    (KR) .................. 10-2013-0106301

(51) Int. Cl.
*H04N 5/262*    (2006.01)
*H04N 5/14*    (2006.01)
(Continued)

(52) U.S. Cl.
CPC ............. *H04N 5/262* (2013.01); *H04N 5/145* (2013.01); *H04N 5/58* (2013.01); *H04N 9/73* (2013.01);
(Continued)

(58) Field of Classification Search
None
See application file for complete search history.

(56) References Cited

U.S. PATENT DOCUMENTS

| 7,776,481 B2 | 8/2010 | Ojima et al. |
| 2006/0152587 A1 | 7/2006 | Kondo et al. |

(Continued)

FOREIGN PATENT DOCUMENTS

| JP | 2007-73325 A | 3/2007 |
| JP | 2007-101867 A | 4/2007 |

(Continued)

OTHER PUBLICATIONS

Communication, Issued by the European Patent Office, Dated Aug. 6, 2014, in counterpart European Application No. 14165869.0.

(Continued)

*Primary Examiner* — Edward Martello
(74) *Attorney, Agent, or Firm* — Sughrue Mion, PLLC

(57) ABSTRACT

A method and a display apparatus for generating and outputting an image generated to apply a special effect to a video are provided. The method includes outputting a video to a first area of a screen of the display apparatus, generating an image based on information comprised in the video, and outputting the generated image to a second area, surrounding the first area.

18 Claims, 12 Drawing Sheets

(51) Int. Cl.
    *H04N 5/58*     (2006.01)
    *H04N 9/73*     (2006.01)
    *H04N 21/431*     (2011.01)
    *H04N 21/439*     (2011.01)
    *H04N 21/44*     (2011.01)
    *H04N 21/84*     (2011.01)
    *H04N 21/41*     (2011.01)

(52) U.S. Cl.
    CPC ....... *H04N 21/431* (2013.01); *H04N 21/4394* (2013.01); *H04N 21/44008* (2013.01); *H04N 21/84* (2013.01); *H04N 21/4122* (2013.01)

(56) References Cited

U.S. PATENT DOCUMENTS

| | | |
|---|---|---|
| 2007/0091111 A1 | 4/2007 | Gutta |
| 2007/0126938 A1* | 6/2007 | Tan ................. H04N 5/144 348/739 |
| 2007/0141545 A1* | 6/2007 | Tan ................. H04N 5/144 434/365 |
| 2008/0152194 A1 | 6/2008 | Lee et al. |
| 2008/0231756 A1 | 9/2008 | Kondo et al. |
| 2012/0128257 A1* | 5/2012 | Quan ................. G06K 9/00758 382/218 |
| 2012/0223885 A1 | 9/2012 | Perez |

FOREIGN PATENT DOCUMENTS

| | | |
|---|---|---|
| JP | 2008-236389 A | 10/2008 |
| KR | 10-2007-0031079 A | 3/2007 |
| KR | 10-2009-0091771 A | 8/2009 |
| KR | 10-1093440 B1 | 12/2011 |
| WO | 2008078236 A1 | 7/2008 |
| WO | 2011073817 A1 | 6/2011 |

OTHER PUBLICATIONS

Pieter Seuntiens; "Visual Experience of 3D-TV with pixelated Ambilight"; PRESENCE; 2007; pp. 339-344.

* cited by examiner

METHOD AND APPARATUS FOR DISPLAYING AN IMAGE SURROUNDING A VIDEO IMAGE

RELATED APPLICATIONS

This application claims the benefit of U.S. Provisional Application No. 61/815,930, filed on Apr. 25, 2013, in the US Patent and Trademark Office and priority from Korean Patent Application No. 10-2013-0106301, filed on Sep. 4, 2013, in the Korean Intellectual Property Office, the disclosures of which are incorporated herein by reference in their entireties.

BACKGROUND

1. Field

Apparatus and methods consistent with the exemplary embodiments relate to displaying an image, and more particularly, to displaying an image as a special effect to a video being played.

2. Description of the Related Art

Various types of devices have been developed to play video content, for example, a variety of televisions (TVs), smartphones, tablet personal computers (PCs), notebook computers, etc.

Similarly, various attempts have been made to develop methods of enlarging a viewing area and realistically providing content to the user. For example, efforts have been made to improve sound quality, provide high resolution images, improve an aspect ratio in a video system, etc.

However, a method and apparatus for displaying an image, in which an image effect is generated based on information included in a video and applied to the video are needed.

SUMMARY

Exemplary embodiments are provided to address the aforementioned and other problems and disadvantages, and an aspect of the present disclosure provides a method and apparatus for displaying an image, in which an image effect is generated based on information included in a video and applied to the video. Aspects of the exemplary embodiments may or may not overcome the aforementioned problems.

Additional aspects will be set forth in part in the description which follows and, in part, will be apparent from the description, or may be learned by practice of the presented embodiments.

According to an aspect of an exemplary embodiment, a method of displaying an image may include outputting a video to a first area of a screen of the display apparatus, generating an image based on information comprised in the video, and outputting the generated image to a second area, surrounding the first area.

The generated image may include at least a part of an image included in at least one frame which is placed prior to a current frame of the video output onto the area in the screen.

The information included in the video is information regarding a motion vector.

The generating of the image may further include determining a type of video movement of the video from among one of a parallel movement, a rotation movement, and a central movement, based on the motion vector, and generating the image based on the determined type of video movement.

The generating of the image may include determining the second area based on the determined type of video movement and the motion vector, and generating the image based on the determined area.

The generating of the image may further be based on voice data included in the video.

The generating of the image based on the voice data may include analyzing a spectrum of the voice data, and generating the image based on at least one of a beat, a minimum volume, a maximum volume, a left volume, and a right volume of the voice data, which are included in the analyzed spectrum of the voice data.

The method may further include: recognizing an image object included in the video, and if the image object moves out of the first area of the screen, generating the image comprising the image object.

The image object may be recognized based on metadata included in the video.

The second area may be a part of the screen of the display apparatus.

According to an aspect of another exemplary embodiment, a display apparatus includes a screen configured to output a video to a first area of the screen, an image generator configured to generate an image based on information comprised in the video, and an auxiliary image output unit configured to output the generated image to a second area surrounding the first area.

The generated image may include at least a part of an image included in at least one frame which is placed prior to a current frame of the video output onto the area in the screen.

The information included in the video may be information regarding a motion vector.

The image generator may further determine a type of video movement of the video from among one of a parallel movement, a rotation movement, and a central movement and generate the image based on the determined type of video movement.

The image generator may further determine the second area based on the determined type of video movement and the motion vector, and the auxiliary image output unit is further configured to output the image based on the determined area The image generator may further generate the image based on voice data comprised in the video.

The image generator may include a spectrum analysis module that analyzes a spectrum of the voice data and generates the image based on at least one of a beat, a minimum volume, a maximum volume, a left volume, and a right volume of the voice data, which are included in the analyzed spectrum of the voice data.

The image generator may include an object recognition module that recognizes an image object included in the video output onto the area in the screen and, if the image object moves out of the first area, generates the image comprising the image object.

The object recognition module may recognize the image object by using metadata included in the video.

The second area may be a part of the screen of the display apparatus.

According to an aspect of another exemplary embodiment, a non-transitory computer-readable recording medium records thereon a program, which, when executed by a computer, performs the method of displaying an image may include outputting a video to a first area of a screen of the display apparatus, generating an image based on information comprised in the video, and outputting the generated image to a second area, surrounding the first area.

According to an aspect of another exemplary embodiment, a method of displaying a video may include outputting a current frame of the video to a display, outputting a previous frame of the video to the display at a position corresponding to motion of the current frame, and masking a portion of the previous frame that overlaps the current frame.

BRIEF DESCRIPTION OF THE DRAWINGS

The above and/or other aspects will become apparent and more readily appreciated by describing certain exemplary embodiments with reference to the accompanying drawings in which.

DETAILED DESCRIPTION OF EXEMPLARY EMBODIMENTS

Figure 1:
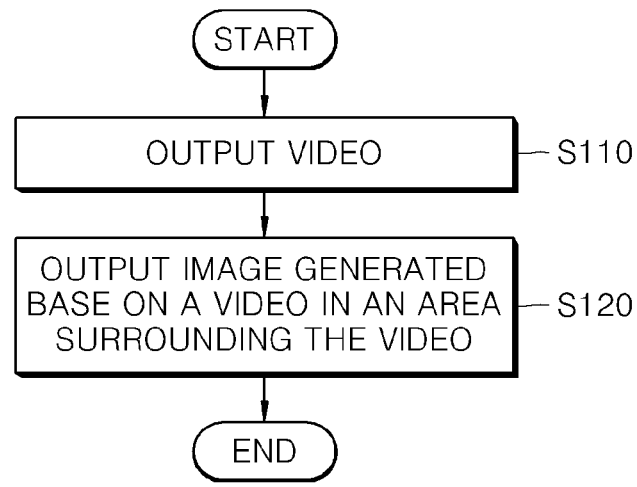
FIG. 1 is a flowchart illustrating a method of processing an image, according to an exemplary embodiment.

Reference will now be made in detail to embodiments of the present general inventive concept, examples of which are illustrated in the accompanying drawings, wherein like reference numerals refer to like elements throughout. The exemplary embodiments are described below in order to explain the present general inventive concept by referring to the figures. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail. As used herein, the term "and/or" includes any and all combinations of one or more of the associated listed items. Expressions such as "at least one of," when preceding a list of elements, modify the entire list of elements and not merely the individual elements of the list.

It will be understood that when an element, such as a layer, a region, or a substrate, is referred to as being "on," "connected to" or "coupled to" another element, it may be directly on, connected or coupled to the other element, or intervening elements may be present. In contrast, when an element is referred to as being "directly on," "directly connected to" or "directly coupled to" another element or layer, there are no intervening elements or layers present. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

In the present specification, video refers to a continuously moving image displayed on a screen of a display apparatus. Also, video data refers to data that may be stored on a storage medium and that a computer reads to play video.

As used herein, a motion vector refers to an element which is used in a motion estimation process and expresses a difference between respective position coordinates of an image and a reference image. For example, the motion vector may be included in video data that is generated according to Moving Picture Experts Group (MPEG) and/or H.264 compression standards for image compression.

Also, an image that is generated from video refers to an image that is generated based on video data.

The exemplary embodiments are described below in order to explain the present general inventive concept in more detail with reference to the drawings.

Figure 2:
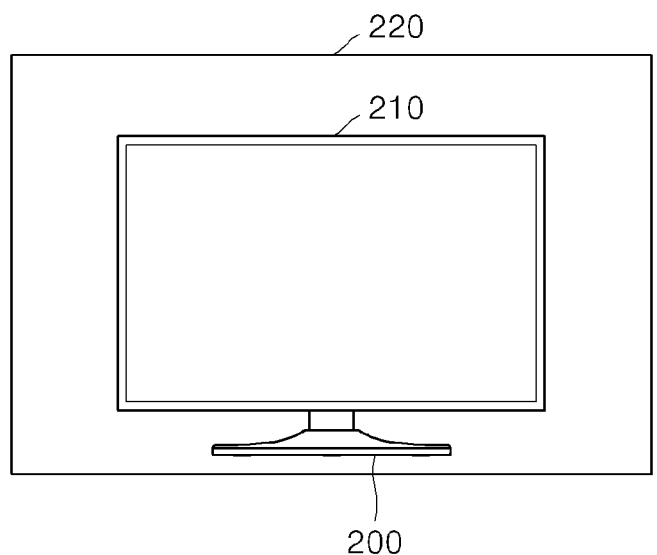
FIG. 2 illustrates a display apparatus according to an exemplary embodiment.

FIG. 1 is a flowchart illustrating a method of processing an image, according to an exemplary embodiment. FIG. 2 illustrates a display apparatus 200 according to an exemplary embodiment.

In step S110, the display apparatus 200 outputs video onto an area of a screen of the display apparatus. The area of the screen may be the whole screen or part of the screen. The display apparatus 200 may be any device that may play video, such as a TV, a smartphone, a personal digital assistant (PDA), a table personal computer (PC), etc.

The video may include video data which is in a digital data format. The video may further include another type of data which is related to the video data. For example, the video may further include metadata or sound data corresponding to the video data.

In step S120, the display apparatus 200 outputs an image generated from the video (based on the video), in a peripheral area 220 surrounding an area 210, in which the video is output. The peripheral area 220 may be an area that is adjacent to a screen of the display apparatus 200 and surrounds the screen, or is adjacent to a side of the screen of the display apparatus 200. The peripheral area 220 may also be an area that is adjacent to an area that outputs the video and surrounds the area that outputs the video, or is adjacent to a side of the area that outputs the video. However, the general inventive concept is not limited thereto.

According to an exemplary embodiment of the present invention, the display apparatus 200 may display at least a portion of an image included in at least one frame positioned before a frame of the video that is output on the screen of the display apparatus 200.

Figure 3:
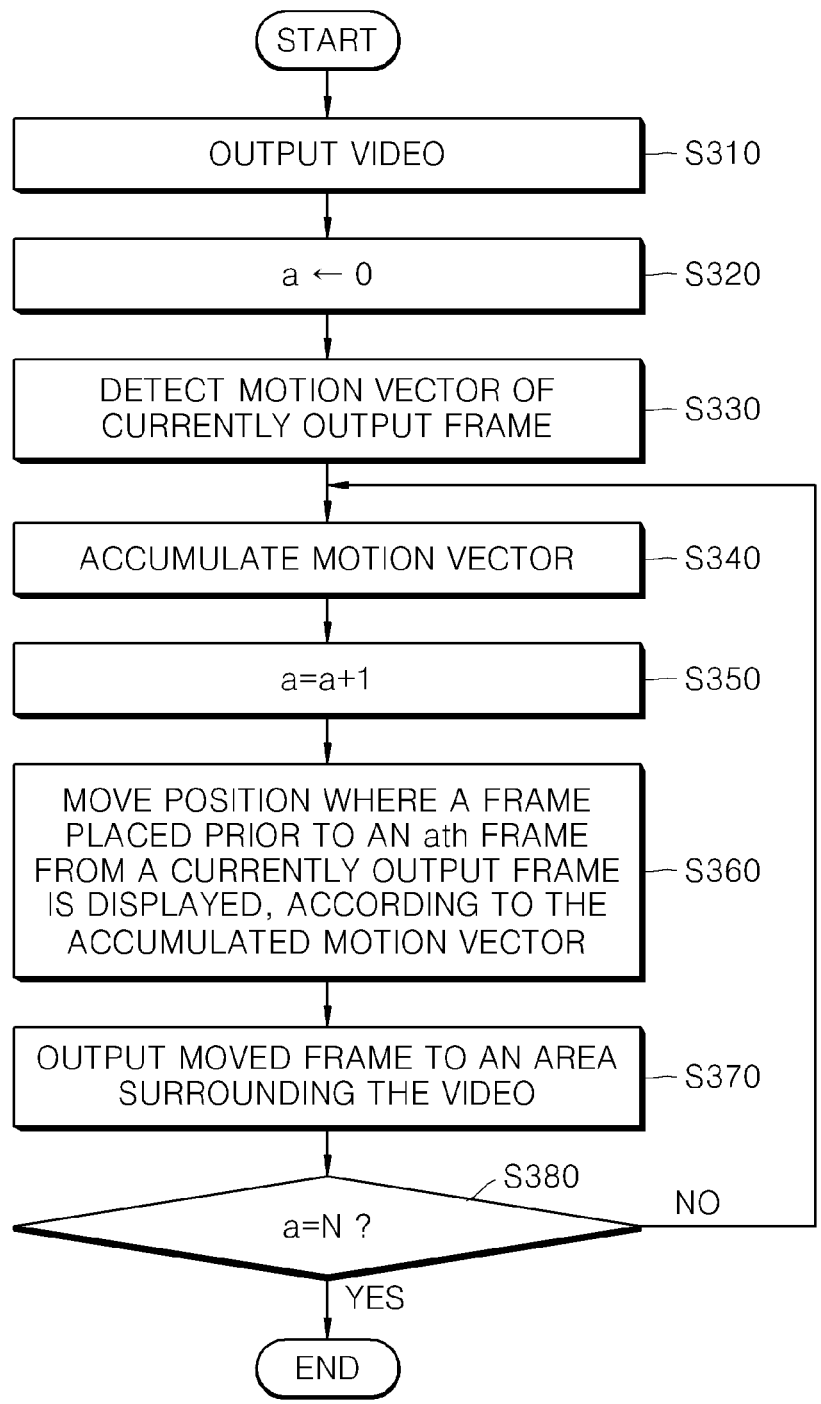
FIG. 3 is a flowchart illustrating a method of processing an image, according to another exemplary embodiment.

FIG. 3 is a flowchart illustrating a method of processing an image, according to another exemplary embodiment.

In step S310, the display apparatus 200 outputs a video. In step S320, the display apparatus 200 sets a value of coefficient "a" to 0 based on N frames of the video output from the display apparatus 200. Here, the coefficient "a" indicates the number times that a process used in generating an image is repeated, wherein the image is output in the peripheral area 220. Here, N denotes a positive integer.

In step S330, the display apparatus 200 detects a motion vector of a currently output frame. According to an exemplary embodiment, the display apparatus 200 may determine a type of video movement of the video being output from the display apparatus 200 using preset types based on the detected motion vector. Here, the type of video movement refers to a pattern of a motion of the video being output from the display apparatus 200. The type of video movement may be one of a parallel movement, a rotation movement and a central movement. If directions of motion vectors detected from blocks are parallel to each other, the display apparatus may determine that the type of video movement is a parallel movement. If directions of motion vectors detected from blocks rotate on one point, the display apparatus may determine that the type of video movement is a rotation movement. If directions of motion vectors detected from blocks are heading toward or away from one point, the display apparatus may determine that type of a video movement is a central movement. For example, if all frames of an image output from the display apparatus 200 move in one direction, the type of video movement may be the parallel movement. According to another example, if the image output from the display apparatus 200 is an image of an airplane that rotates, the type of video movement may be a rotation movement. According to another example, if the image output from the display apparatus 200 is an image of a car that passes through a tunnel and is moving forward, the type of video movement may be a central movement.

According to an exemplary embodiment, the display apparatus 200 may store frames, which include frames of currently output video up to frames positioned before an Nth frame, in a memory (not shown) of the display apparatus 200. For example, if the video includes first through 20th frames, a seventh frame is output on the display apparatus 200, and N is 3, the display apparatus 200 may store frames from a fourth frame to a sixth frame in the memory.

According to another exemplary embodiment, N may be determined based on a size of the motion vector detected in step S330. For example, if the size of the motion vector is large, that is, if the motion vector includes a large number of frames, the display apparatus 200 may generate an image based on the large number of frames. If the size of the motion vector is small, that is, if the motion vector includes a small number of frames, the display apparatus 200 may generate an image based on the small number of frames.

In step S340, the display apparatus 200 accumulates the detected motion vectors. If the display apparatus 200 does not accumulate the detected motion vector, the motion vector may have a value of about 0. According to an exemplary embodiment, the accumulated motion vector may be one of detected motion vectors or one determined from the detected motion vectors. The accumulated motion vector may be differently determined according to several different embodiments. In step S350, the display apparatus 200 increases the coefficient "a" that indicates the number of times the process is repeated. According to an exemplary embodiment, the value of the coefficient is increased by one each time the process is repeated.

In step S360, the display apparatus 200 moves a position in which a frame placed prior to an $a^{th}$ frame from a currently output frame is displayed, according to the accumulated motion vector. For example, if the accumulated motion vector has a magnitude of 4 in a horizontal axis direction and 3 in a vertical axis direction, the frame before the $a^{th}$ frame may be moved by 4 movement units in the horizontal axis direction and 3 movement units in the vertical axis direction. The movement unit may be a block, a pixel, or a group of pixels, but is not limited thereto.

According to another exemplary embodiment, in step S360, the display apparatus 200 may enlarge an area in which the frame before the $a^{th}$ frame from the currently output frames will be displayed, based on the accumulated motion vector.

According to another exemplary embodiment, in step S360, the display apparatus 200 may rotate the frame before the $a^{th}$ frame from among the currently output frames about one axis, based on the accumulated motion vector.

In step S370, the display apparatus 200 outputs a moved, enlarged, or reduced image in the peripheral area 220 surrounding the area 210, in which the video is displayed. In step S380, the display apparatus 200 repeats steps S340 through 370 N times.

Figure 4:
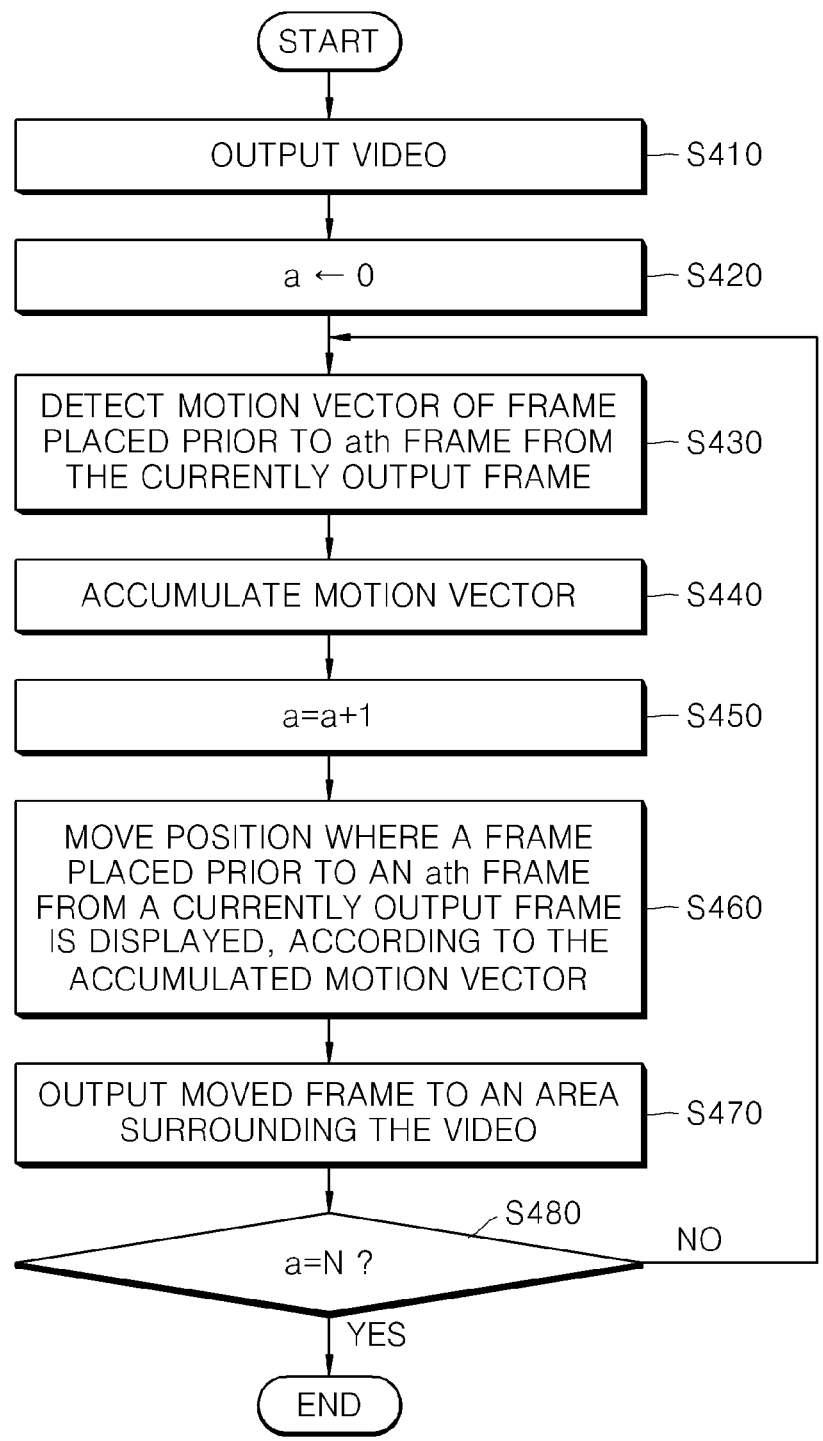
FIG. 4 is a flowchart illustrating a method of processing an image, according to another exemplary embodiment.

FIG. 4 is a flowchart illustrating a method of processing an image, according to another exemplary embodiment.

In step S410, the display apparatus 200 outputs a video. In step S420, the display apparatus 200 sets a value of coefficient "a" to 0 based on N frames of the video output from the display apparatus 200, wherein the coefficient "a" indicates the number of times the process of generating an image is repeated, wherein the image is output in the peripheral area 220. Here, N denotes a positive integer.

In step S430, the display apparatus 200 detects a motion vector of a frame before $a^{th}$ frame from among the currently output frames. According to an exemplary embodiment, the display apparatus 200 may determine a type of video movement output from the display apparatus 200 using preset types based on the detected motion vector. The type of video movement refers to a pattern of a motion of the video output from the display apparatus 200. The type of video movement may be one of a parallel movement, a rotation movement, and a central movement. For example, if all frames of the image output from the display apparatus 200 move in one direction, the type of video movement may be a parallel movement. According to another example, if the image output from the display apparatus 200 is an image of an airplane that rotates, the type of video movement may be a rotation movement. According to another example, if the image output from the display apparatus 200 is an image of a car that passes through a tunnel and is moving forward, the type of video movement may be a central movement.

According to an exemplary embodiment, the display apparatus 200 may store frames, which range from frames of currently output video to frames before an $N^{th}$ frame, in a memory (not shown) of the display apparatus 200. For example, if the video includes first through $20^{th}$ frames, a seventh frame is output on the display apparatus 200, and N is 3, the display apparatus 200 may store frames from a fourth frame to a sixth frame in the memory.

According to an embodiment of the present invention, N may be determined based on a size of the motion vector detected in step S430. For example, if the size of the motion vector is large, that is, if the motion vector includes a large number of frames, the display apparatus 200 may generate an image based on the large number of frames. If the size of the motion vector is small, the display apparatus 200 may generate the image based on the small number of frames.

In step S440, the display apparatus 200 accumulates the motion vector detected in step S430. If the display apparatus 200 does not accumulate the motion vector, the motion vector may have a value of about 0. According to an exemplary embodiment, the accumulated motion vector may be one of detected motion vectors or one determined from the detected motion vectors. The accumulated motion vector may be differently determined according to several different embodiments. In step S450, the display apparatus 200 increases the coefficient "a" that indicates the number of times the process is repeated. According to an exemplary embodiment, the value of the coefficient is increased by one each time the process is repeated.

In step S460, the display apparatus 200 moves the position in which the frame placed prior to an $a^{th}$ frame from a currently output frame is displayed, according to the accumulated motion vector. For example, if the accumulated motion vector is 4 movement units in a horizontal axis direction and 3 in a vertical axis direction, the frame before the $a^{th}$ frame may be moved by 4 movement units in the horizontal axis direction and 3 movement units in the vertical axis direction. The movement unit may be a block, a pixel, or a group of pixels, but is not limited thereto.

According to another exemplary embodiment, in step S460, the display apparatus 200 may enlarge an area in which the frame before the $a^{th}$ frame from among the currently output frames will be displayed, based on the accumulated motion vector.

According to another exemplary embodiment, in step S460, the display apparatus 200 may rotate the frame before the $a^{th}$ frame from among the currently output frames about one axis, based on the accumulated motion vector.

In step S470, the display apparatus 200 outputs the moved, enlarged, or reduced image in the peripheral area 220 surrounding the area 210, in which the video is displayed. In step S480, the display apparatus 200 repeats steps S430 through S470 N times.

Figure 5:
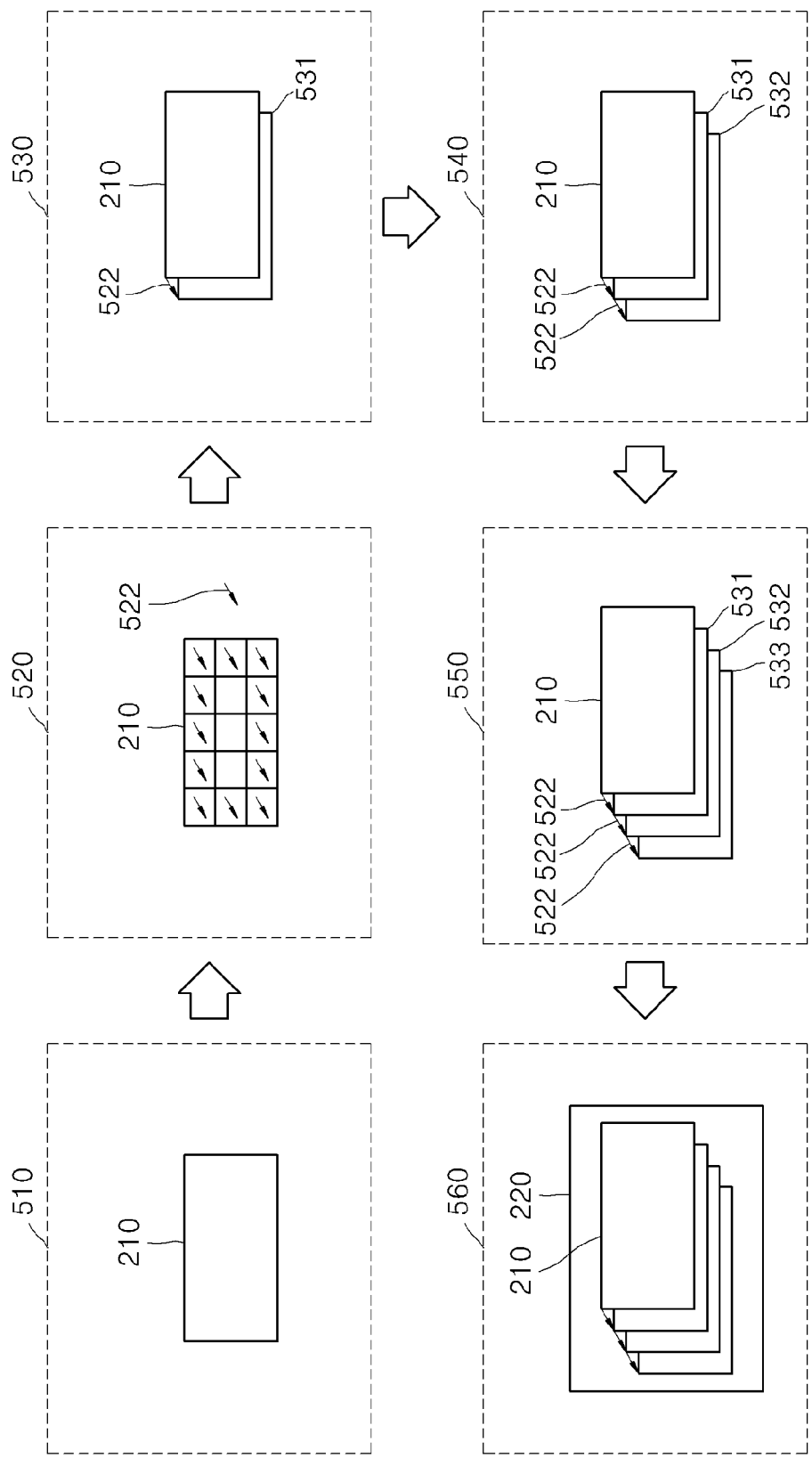
FIG. 5 illustrates a method of processing and outputting an image if the video movement is a parallel movement, according to an exemplary embodiment.

FIG. 5 illustrates a method of processing and outputting an image if the video movement is a parallel movement, according to an exemplary embodiment.

A display apparatus outputs video 510 and detects a motion vector from the output video; 520 illustrates a detection of a motion vector 522 included in an area 210, in which the video is output. The display apparatus may divide the output video into a plurality of blocks and detect motion vectors for each of the plurality of blocks. If the motion vectors detected for the plurality of blocks are pointed in similar directions as shown in 520, the display apparatus may determine that the type of video movement is a parallel movement. The display apparatus may determine one motion vector 522 from the detected motion vectors. Here, the motion vector 522 may be selected from a plurality of motion vectors detected from the plurality of blocks or may be determined by using an average value of the plurality of motion vectors. However, the method of determining the one motion vector is not limited thereto, and the motion vector 522 may be differently determined according to embodiments.

The display apparatus may move a prior frame's position 530, such that a first previous frame 531 is displayed, based on the motion vector 522. The first previous frame 531 refers to a frame positioned one frame unit ahead of the frame 210 displayed on the display apparatus. The frame unit refers to the number of frames. The display apparatus may apply a mask to the first previous frame 531 so that it does not overlap the current frame displayed on the display apparatus along with the first previous frame 531. The display apparatus may accumulate the motion vector 522 and further move a prior frame's position 540, such that a second previous frame 532 is displayed, based on the accumulated motion vector. For example, if the motion vector 522 has a value of (−1, −2), the display apparatus may move the position in which the first previous frame 531 is displayed, by (−1, −2) and move the position in which the second previous frame 532 is displayed, by (−2, −4). The numbers in bracket indicate the numbers of movement units on X axis and Y axis. The display apparatus may accumulate the motion vector 522 and further move a prior frame's position 550 such that a third previous frame 533 is displayed, based on the accumulated motion vector. As shown in 530, the display apparatus may apply a mask to avoid overlap of the second previous frame 532 and the third previous frame 533. The process in which the display apparatus accumulates the motion vector 522 and moves a position of a frame prior to a current frame output on the display apparatus may be repeated N times.

The display apparatus may output the frames 531, 532, and 533 of which positions are changed based on the motion vector 522, in a peripheral area 220 surrounding an area 210, in which the video is output 560.

Figure 6:
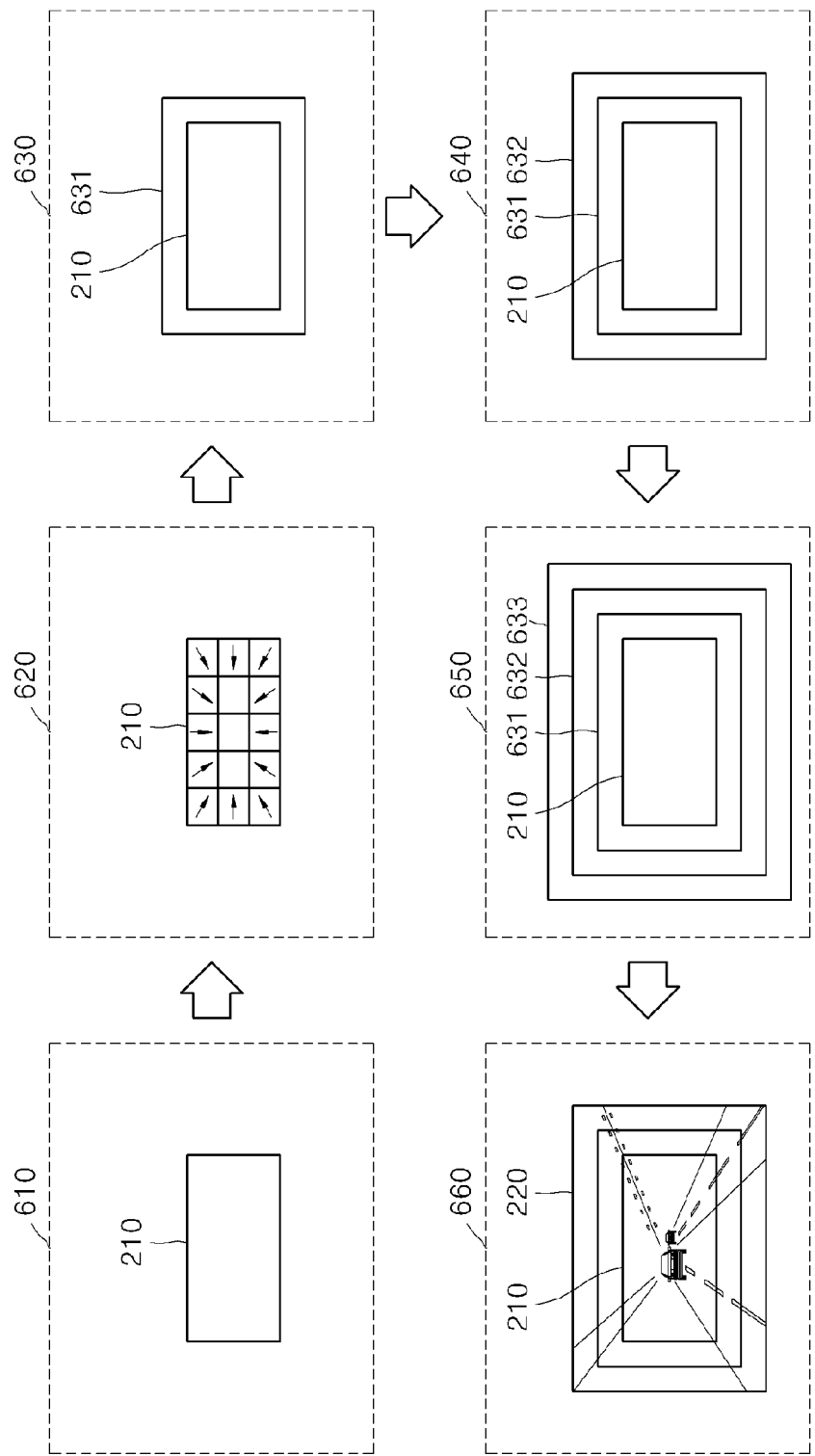
FIG. 6 illustrates a method of processing and outputting an image if the video movement is a central movement, according to another exemplary embodiment.

FIG. 6 illustrates a method of processing and outputting an image if the video movement is a central movement, according to another exemplary embodiment.

A display apparatus outputs video 610 and detects a motion vector from the output video. 620 illustrates a detection of a motion vector included in an area 210, in which the video is output. The display apparatus may divide the output video into a plurality of blocks and detect motion vectors for each of the plurality of blocks. If the plurality of motion vectors detected for the plurality of blocks are directed toward a single point as shown in 620, the display apparatus may determine that the type of video movement is a central movement. A single point that the plurality of motion vectors are directed toward may be referred to as a central point. If the type of video movement is a central movement, the display apparatus may determine a scale for enlarging or reducing a frame size, which occurs prior to a current frame of the video is output on the display apparatus, based on the plurality of motion vectors detected from the plurality of blocks. The scale may be determined based on sizes of the detected motion vectors. However, the method of determining the scale is not limited thereto, and the scale may be differently determined according to several different embodiments.

The display apparatus may enlarge or reduce an area in which a first previous frame 631 is displayed, based on the determined scale 630. The first previous frame 631 refers to a frame positioned one frame unit ahead of the frame 210 of the video displayed on the display apparatus. The frame unit refers to the number of frames. The display apparatus may apply a mask to the first previous frame 631 so that the first previous frame 631 does not overlap with a frame currently displayed on the display apparatus. The display apparatus may accumulate the scale and enlarge or reduce an area in which a second previous frame 632 is displayed, based on the accumulated scale 640. The accumulated scale is calculated by multiplying or adding the determined scale with a previous scale. For example, if the determined scale is 2, the display apparatus may enlarge an area, in which a first previous frame will be displayed, by a factor of two and enlarge an area, in which a second previous frame will be displayed, by a factor of four. The display apparatus may accumulate the scale and move a position, in which a third previous frame is displayed, based on the accumulated scale 650. As shown in 630, the display apparatus may apply a mask to avoid overlap of the second previous frame 632 and the third previous frame 633 with another frame. The process in which the display apparatus accumulates the motion vector 522 and moves a position of a frame prior to a current frame output on the display apparatus may be repeated N times.

The display apparatus may output enlarged or reduced frames 631, 632, and 633 in a peripheral area 220 of the area 210 in which the video is output 660.

Figure 7:
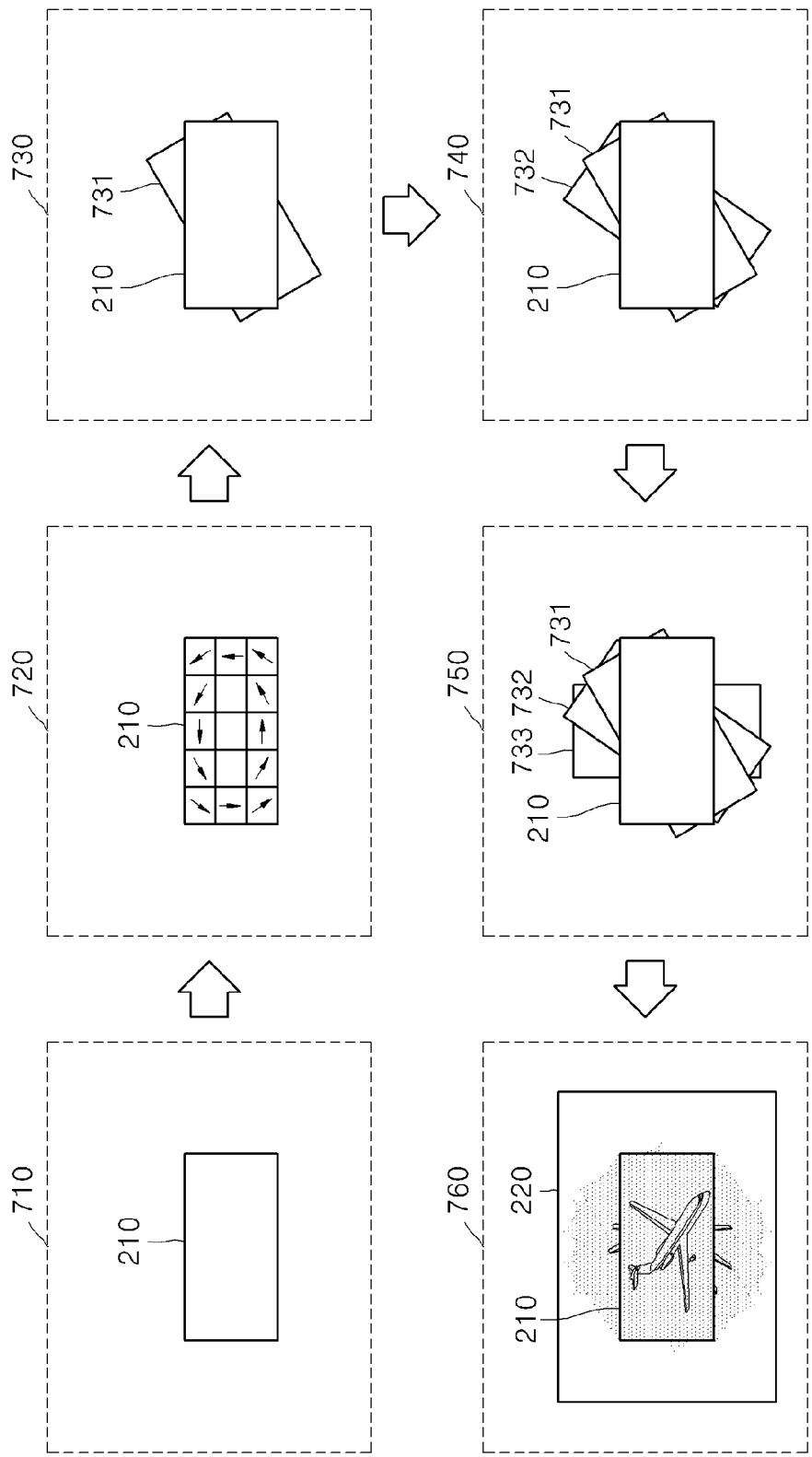
FIG. 7 illustrates a method of processing and outputting an image if the video movement is a rotation movement, according to another exemplary embodiment.

FIG. 7 illustrates a method of processing and outputting an image if the video movement is a rotation movement, according to another exemplary embodiment.

A display apparatus outputs video 710 and detects a motion vector from the output video. 720 illustrates a detection of a motion vector included in an area 210, in which the video is output. The display apparatus may divide the output video into a plurality of blocks and detect motion vectors for each of the plurality of blocks. If a plurality of motion vectors detected for the plurality of blocks rotate about a single point as shown in 720, the display apparatus may determine that the type of video movement is a rotation movement. If the type of video movement is a rotation movement, the display apparatus may determine a rotation angle at which a previous a frame of the video output on the display apparatus will rotate, about the single point, based on the plurality of motion vectors detected from the plurality of blocks. The rotation angle may be determined based on sizes of the detected motion vectors. However, the method for determining the rotation angle is not limited thereto, and the rotation angle may be differently determined according to several different embodiments.

The display apparatus may rotate an area in which a first previous frame 731 is displayed, based on the determined rotation angle 730. The first previous frame 731 refers to a frame positioned one frame unit ahead of the frame 210 of the video displayed on the display apparatus. The frame unit refers to the number of frames. The display apparatus may apply a mask to the first previous frame 731 so that the first previous frame 731 does not overlap with the frame currently displayed on the display apparatus. The display apparatus may accumulate the rotation angle and rotate an area in which a second previous frame 732 is displayed, based on the accumulated rotation angle 740. The accumulated rotation angle is calculated by adding the determined rotation angle with a previous rotation angle. For example, if the determined rotation angle is 15°, the display apparatus may rotate an area in which a first previous frame is displayed, by 15°, and rotate an area in which a second previous frame will be displayed, by 30°. The display apparatus may accumulate the rotation angle and move a position in which a third previous frame 733 will be displayed, based on the accumulated rotation angle 750. As shown in 730, the display apparatus may apply a mask to avoid overlap of the second previous frame 732 and the third previous frame 733 with another frame. The display apparatus may accumulate the rotation angle and repeat a process of rotating an area in which a previous frame of a frame output on the display apparatus will be displayed N times.

The display apparatus may output rotated frames 731, 732, and 733 in a peripheral area 220 of the area 210 in which the video is output 760.

According to an exemplary embodiment, the display apparatus may move/enlarge/rotate a subsequent frame (instead of a prior frame) using the above described methods, thereby displaying subsequent frame images.

Figure 8:
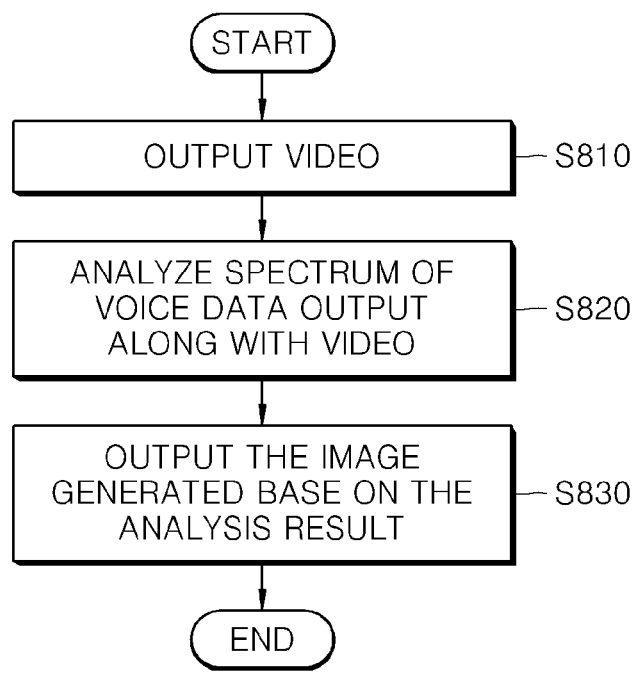
FIG. 8 is a flowchart illustrating a method of processing an image, according to another exemplary embodiment.

FIG. 8 is a flowchart illustrating a method of processing an image, according to another exemplary embodiment.

According to an exemplary embodiment, in step S810, a display apparatus may output a video. In step S820, the display apparatus analyzes a spectrum of voice data that is output when the video content is reproduced. In step S820, the display apparatus may further analyze the spectrum of the voice data to determine at least one of a maximum volume, a minimum volume, a left volume, a right volume, a beat, etc., of a voice signal included in the voice data.

In step S830, the display apparatus outputs an image that is generated based on the result of the voice data analyzed in step S820.

Figure 9:
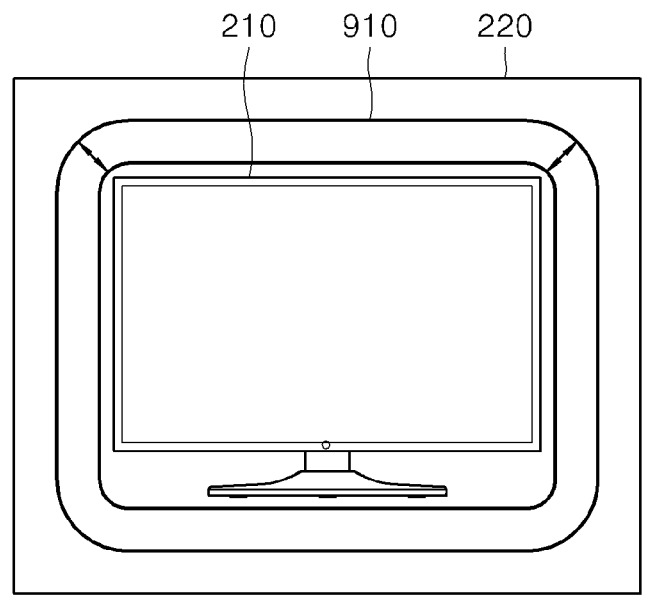
FIG. 9 illustrates an image which is output in an area surrounding the area displaying the video, according to an exemplary embodiment.

FIG. 9 illustrates an image which is output in an area surrounding the area displaying the video, according to an exemplary embodiment.

According to an exemplary embodiment, a display apparatus may enlarge or reduce a preset FIG. 910 in a peripheral area 220 surrounding an area 210, in which the video is output, based on an analyzed maximum volume or a minimum volume of a voice signal included in a spectrum of voice data.

For example, if the volume of the voice signal is high, the display apparatus may display the preset FIG. 910 such that the preset FIG. 910 is large in size. If the volume of the voice signal is small, the display apparatus may display the preset FIG. 910 such that the preset FIG. 910 is small in size.

According to another exemplary embodiment, the display apparatus may increase or reduce the size of the preset FIG. 910 according to a beat of the voice signal.

Figure 10:
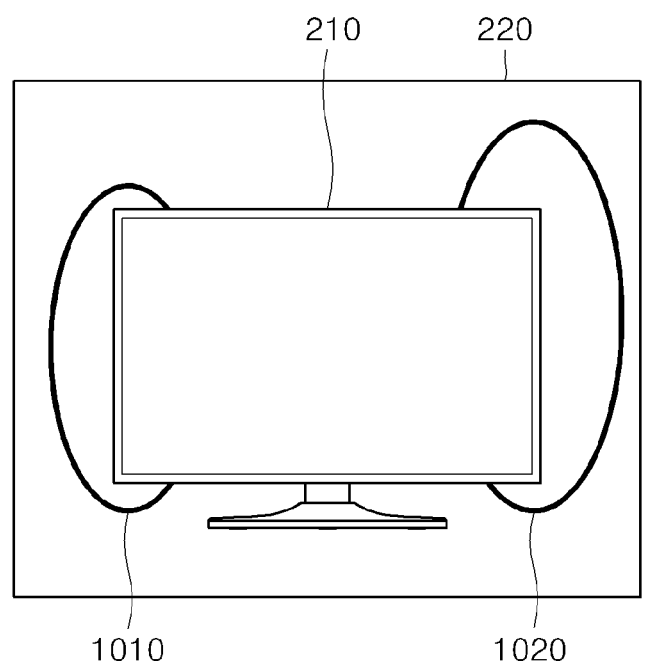
FIG. 10 illustrates an image which is output in an area surrounding the area displaying the video, according to another exemplary embodiment.

According to an exemplary embodiment, objects 910, 1010, and 1020 shown in FIGS. 9 and 10 may be preset general figures or figures included in the video. For example, the preset general figures may include at least one of a circle, a square, a triangle, etc.

FIG. 10 illustrates an image which is output in an area surrounding the area displaying the video, according to another exemplary embodiment.

According to an exemplary embodiment, a display apparatus may display preset FIGS. 1010 and 1020 in a peripheral area 220 of an area 210 in which video is output, based on a left volume and a right volume analyzed from a spectrum of voice data.

For example, if the right volume of a voice signal is greater than the left volume, the display apparatus may display the preset FIG. 1010 such that the preset FIG. 1010 is small in size and displayed on the left side of the peripheral area 220 and also display the preset FIG. 1020 such that the preset FIG. 1020 is large in size and displayed on the right side of the peripheral area 220.

Figure 11:
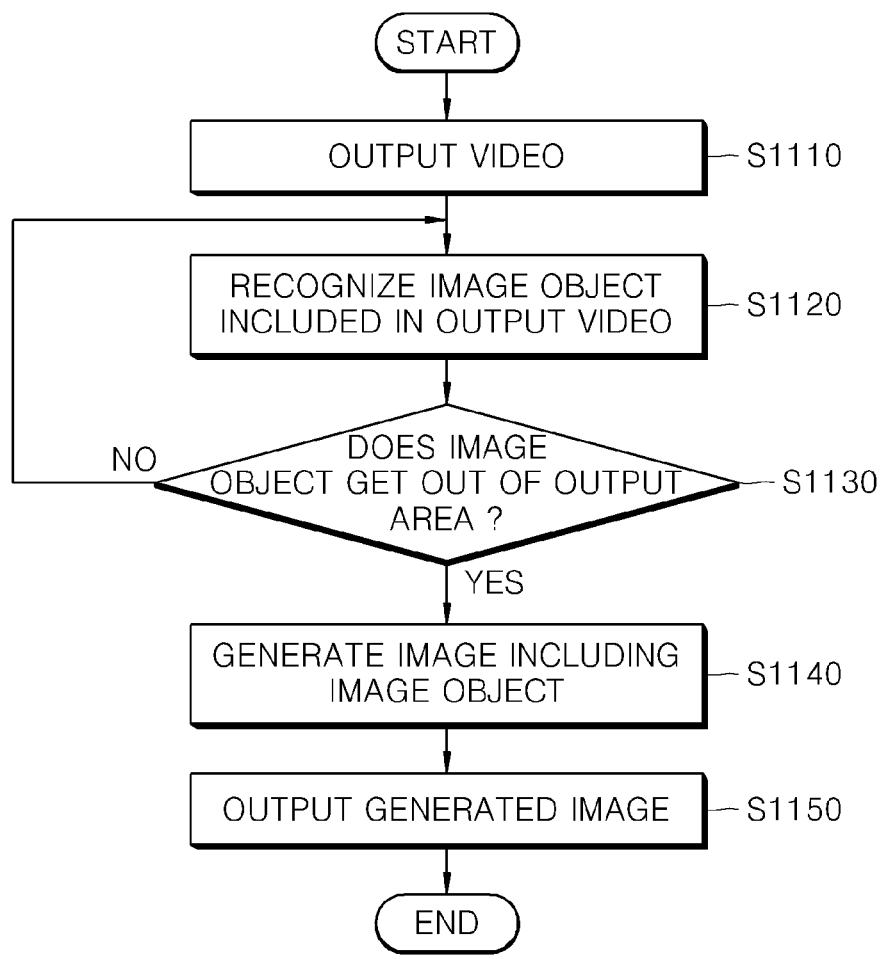
FIG. 11 is a flowchart illustrating a method of processing an image, according to another exemplary embodiment.

FIG. 11 is a flowchart illustrating a method of processing an image, according to another exemplary embodiment.

In step S1110, a display apparatus outputs a video. In step S1120, the display apparatus recognizes an image object included in the output video. The image object refers to an image/shape of an object included in the video. For example, if a person or a ball is included in the video, the person or the ball may be referred to as an image object.

The display apparatus may recognize the image object by using various methods. For example, the display apparatus may recognize the image object by using image recognition to analyze a frame of the video output on the display apparatus. According to another example, the display apparatus may recognize the image object by analyzing metadata included in the video. The metadata is data for describing information about the video and may include information about the image objects included in the video.

In step S1130, the display apparatus determines whether the image object moves out of the area in which the video is output on the display apparatus. If it is determined in step S1130 that the image object has moved out of the area in which the video is output, on the display apparatus, the display apparatus generates an image including the image object in step S1140. The display apparatus may display the image generated in step S1140 in a peripheral area surrounding the area in which the video is output in step S1150.

Figure 12:
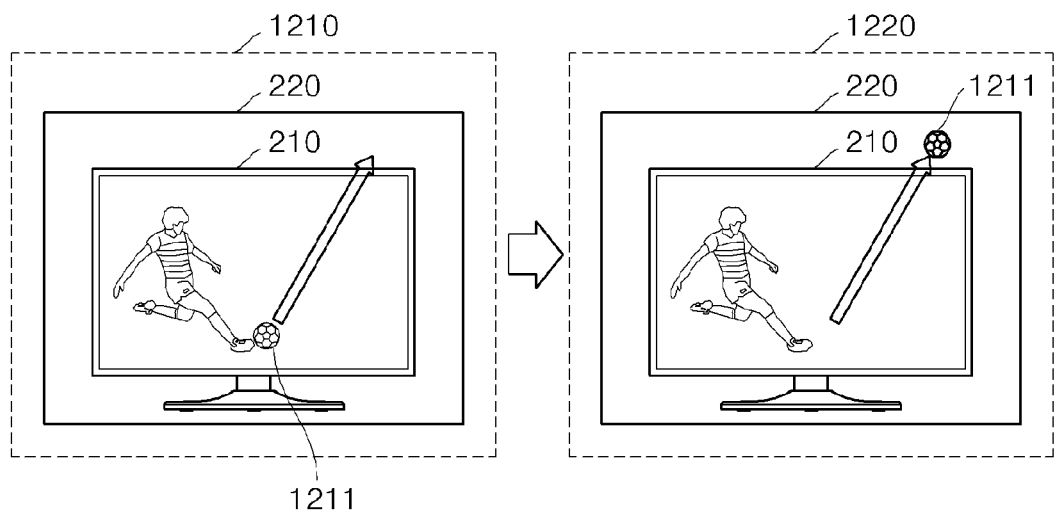
FIG. 12 illustrates an image, incorporating an object that is displayed in the video, which is output in an area surrounding the area displaying the video, according to an exemplary embodiment.

FIG. 12 illustrates an image, incorporating an object that is displayed in the video, which is output in an area surrounding the area displaying the video, according to an exemplary embodiment.

As shown in 1210, according to an exemplary embodiment, a display apparatus may output video including a ball 1211 (image object). If the ball 1211 moves out of the area 210 in which the video is output, when the video is played, the display apparatus may display the ball 1211 in a peripheral area 220 surrounding the area 210 in which the video is output 1220.

Figure 13:
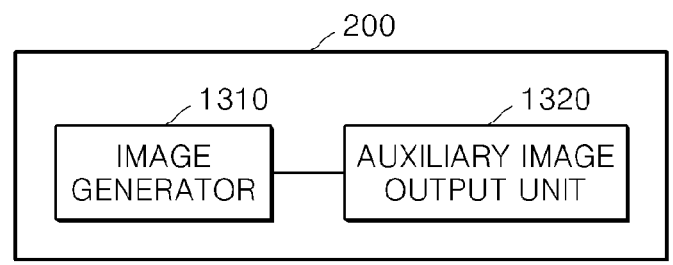
FIG. 13 is a block diagram illustrating a structure of a display apparatus, according to an exemplary embodiment.

FIG. 13 is a block diagram illustrating a structure of a display apparatus 200, according to an exemplary embodiment.

The display apparatus 200 according to exemplary embodiment includes an image generator 1310 and an auxiliary image output unit 1320.

Although not shown in FIG. 13, the display apparatus 200 may further include a screen (not shown) for outputting video. The display apparatus 200 may generate an image based on information included in the video displayed in an area on the screen.

According to an exemplary embodiment, the display apparatus 200 may display at least a portion of an image included in at least one frame prior to the current frame of the video that is output on the screen of the display apparatus 200.

According to an exemplary embodiment, the image generator 1310 may generate an image by using motion vectors of information included in the video. The image generator 1310 may determine one of a parallel movement, a rotation movement, and a central movement as a type of video movement based on the motion vector. However, the type of video movement is not limited thereto. The image generator 1310 may generate the image according to the determined type of video movement.

According to an exemplary embodiment, the image generator 1310 may determine an area in which an image included in at least one previous frame will be output, based on the determined type of video movement and the motion vector.

The auxiliary image output unit 1320 may display the image generated by the image generator 1310 in a peripheral area surrounding an area in which the video is output. The auxiliary image output unit 1320 may include an output unit for displaying the image generated by the image generator 1310 in the peripheral area surrounding the area in which the video is output. The output unit of the auxiliary image output unit 1320 may be variously realized according to several different embodiments.

According to another exemplary embodiment, the image generator 1310 may generate an image based on voice data included in the video. In general, when the video is played, a visual content and a voice content are played together. The image generator 1310 may include a spectrum analysis module (not shown) that analyzes a spectrum of the voice data. The image generator 1310 may generate the image based on an analysis result. The image generator 1310 may generate the image based on at least one of a beat, a minimum volume, a maximum volume, a left volume, and a right volume of the voice data included in the spectrum analyzed by the spectrum analysis module. However, the basis for generating the image is not limited thereto.

According to another exemplary embodiment, the image generator 1310 may further include an object recognition module (not shown) that recognizes the image object included in the video that is output on the display apparatus. The object recognition module may be variously realized according to several different embodiments. According to an exemplary embodiments, the object recognition module may recognize the image object included in the video by using the image recognition or metadata included in the video. As the video is played, the object recognition module may determine whether the image object moves out of the area in which the video is output. If it is determined that the image object has moved out of the area in which the video is output, the image generator 1310 may generate the image including the image object.

Figure 14:
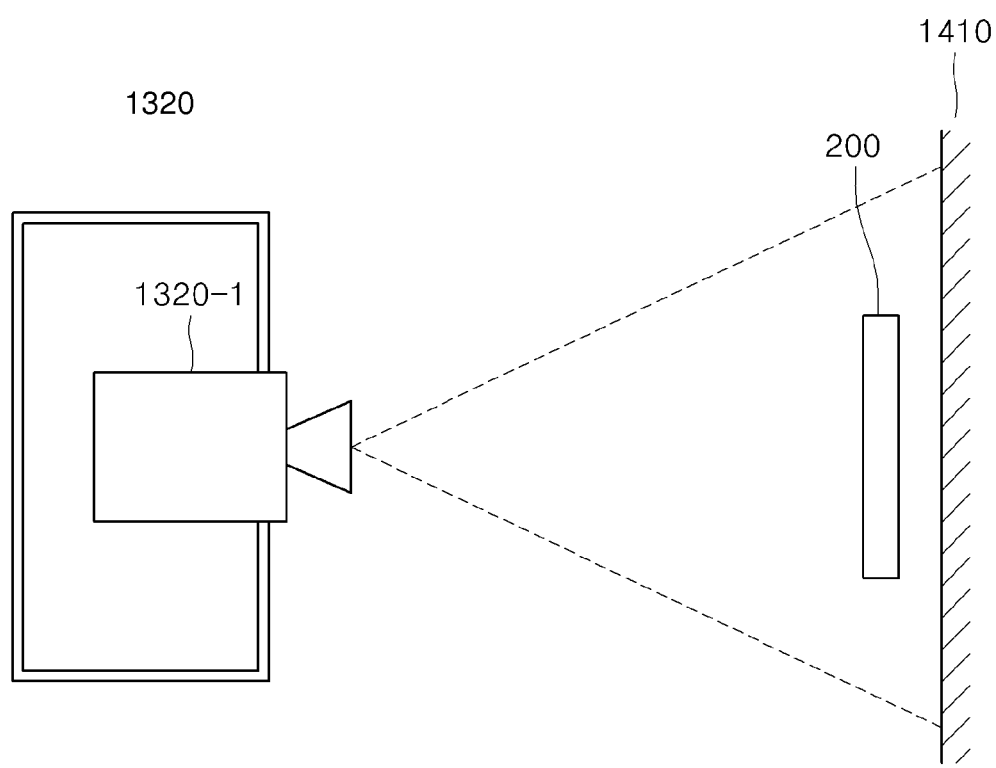
FIG. 14 illustrates an image which is output in an area surrounding the area displaying the video, according to an exemplary embodiment.

FIG. 14 illustrates an image which is output in an area surrounding the area displaying the video, according to an exemplary embodiment.

According to an embodiment of the present invention, the auxiliary image output unit 1320 may include a projector 1320-1 that displays an image in a peripheral area surrounding an area in which the video is displayed. For example, the auxiliary image output unit 1320 may project the image generated by the image generator 1310 onto a wall surface 1410 positioned on a behind the display apparatus 200 by using the projector 1320-1.

Figure 15:
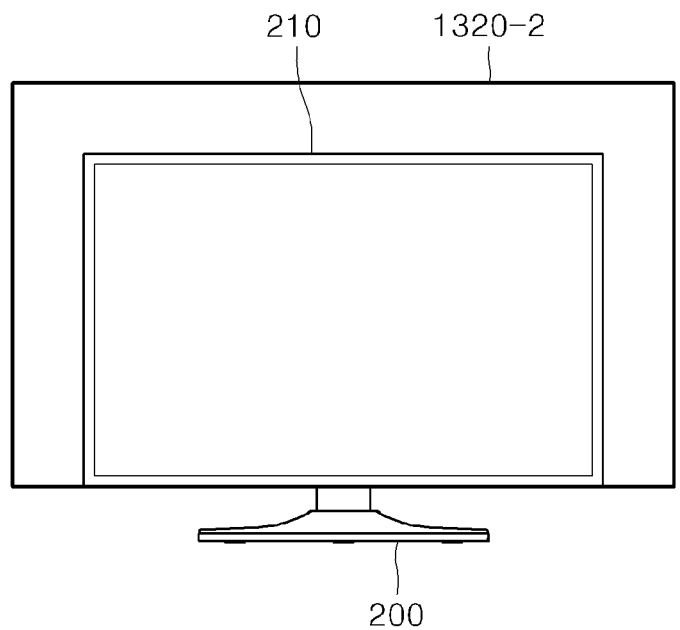
FIG. 15 illustrates an image which is output in an area surrounding the area displaying the video, according to another exemplary embodiment.

FIG. 15 illustrates an image which is output in an area surrounding the area displaying the video, according to another exemplary embodiment.

According to an exemplary embodiment of the present invention, the auxiliary image output unit 1320 may include an auxiliary image output unit 1320-2 that is positioned on at least one side of the display apparatus 200. The auxiliary image output unit 1320-2 may be a transparent display that is combined with a side of the display apparatus 200. In other words, if an image is not displayed, the auxiliary image output unit 1320-2 may remain in a transparent state. If the image generator 1310 generates an image for applying an additional effect based on the video that is played, the auxiliary image output unit 1320-2 may display the generated image.

According to an exemplary embodiment of the present invention, the auxiliary image output unit 1320-2 may be realized as an apparatus alongside a display unit that outputs video or may be realized as a separate apparatus that is connected to the display apparatus 200.

Figure 16:
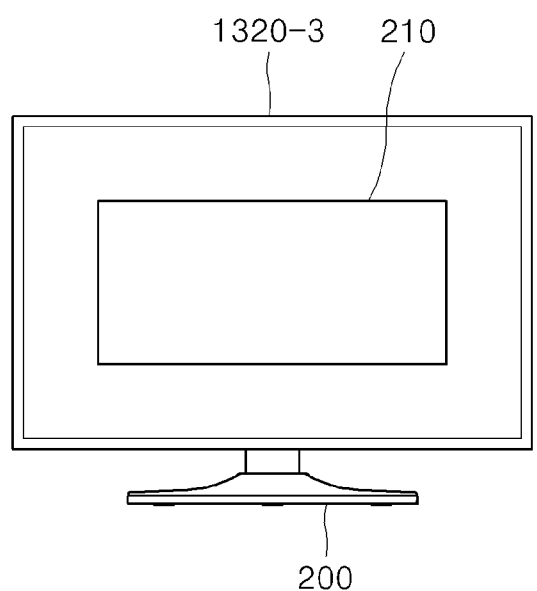
FIG. 16 illustrates an image which is output in an area surrounding the area displaying the video, according to another exemplary embodiment.

FIG. 16 illustrates an image which is output in an area surrounding the area displaying the video, according to another exemplary embodiment According to an exemplary embodiment, if the display apparatus 200 includes a display unit having an area large enough for displaying the video and the auxiliary image, an area 210 in which video is output, and an area 1320-3 in which the image generated by the image generator 1310 is output, may be simultaneously displayed in the display unit.

The present invention may be embodied as a non-transitory computer readable recording medium including a command executable by a computer such as a program module executed in a computer. A computer-readable medium may be an arbitrary usable medium that may be accessed by a computer and may include all types of media such as volatile and nonvolatile media, and separable and non-separable media. Also, the computer-readable medium may include all of computer storage medium and communication medium. The computer storage medium may include all of volatile and nonvolatile media, and separable and non-separable media that are embodied with an arbitrary method or technology for storing information such as a computer-readable command, a data structure, a program module, or other data. The communication medium includes a computer-readable command, a data structure, a program module, other data of a modulated data signal, or other transmission mechanisms and an arbitrary information transmission medium. The computer-readable medium may be a hard disk, a compact disk (CD), a digital versatile disk (DVD), a Blue-ray memory, a flash memory, or the like. A recording medium according to an exemplary embodiment may record a program for outputting video on a screen of a display apparatus, generating an image from information included in the video that is output on the display apparatus, and outputting the generated image around an area in which the video is output.

It should be understood that the exemplary embodiments described therein should be considered in a descriptive sense only and not for purposes of limitation. Descriptions of features or aspects within each embodiment should typically be considered as available for other similar features or aspects in other embodiments. For example, each element that has been described as a single type may be executed in a distribution fashion, and elements that have been described as being executed in a distribution fashion may be combined with one another to be executed.

Although a few exemplary embodiments have been shown and described, the present disclosure is not limited to the aforementioned particular exemplary embodiments, and could be variously modified and achieved by those skilled in the art to which the present disclosure pertains without deviating from the principles and spirit of the present disclosure which is claimed in the claims, and such modifications should not be understood separately from the technical concept or prospect of the present disclosure.

What is claimed is:

1. A method of displaying an image, the method comprising:
    outputting a video to a first area of a screen of a display apparatus;
    detecting a motion vector of a current frame of the video;
    generating at least one previous frame of the current frame based on the motion vector, and information comprised in the video; and
    outputting the at least one previous frame to a second area surrounding the first area,
    wherein the outputting the at least one previous frame includes displaying the at least one previous frame at a position determined based on the motion vector, and
    wherein a number of the at least one previous frame is determined based on a size of the motion vector.

2. The method of claim 1, wherein the generating at least previous frame further comprises:
    determining a type of video movement of the video from among one of a parallel movement, a rotation movement, and a central movement, based on the motion vector; and
    generating the at least one previous frame based on the determined type of video movement.

3. The method of claim 2, wherein the generating the at least one previous frame further comprises
    determining the second area based on the determined type of video movement and the motion vector.

4. The method of claim 1, further comprising:
    generating at least one image based on voice data comprised in the video; and
    outputting the at least one image to the second area.

5. The method of claim 4, wherein the generating the at least one image based on the voice data comprises:
    analyzing a spectrum of the voice data; and
    generating the at least one image based on at least one of a beat, a minimum volume, a maximum volume, a left volume, and a right volume of the voice data, which are comprised in the analyzed spectrum of the voice data.

6. The method of claim 1, further comprising:
    recognizing an image object comprised in the video; and
    if the image object moves out of the first area of the screen, generating at least one image comprising the image object.

7. The method of claim 6, wherein the image object is recognized based on metadata comprised in the video.

8. The method of claim 1, wherein the second area is a part of the screen of the display apparatus.

9. A display apparatus comprising:
    a screen configured to output a video to a first area of the screen;
    an image generator configured to detect a motion vector of a current frame of the video, and generate at least one previous frame of the current frame based on the motion vector, and information comprised in the video; and
    an auxiliary image output unit configured to output the at least one previous frame to a second area surrounding the first area,
    wherein the auxiliary image output unit is further configured to display the at least one previous frame at a position determined based on the motion vector, and
    wherein the image generator is further configured to generate a number of the at least one previous frame based on a size of the motion vector.

10. The display apparatus of claim 9, wherein the image generator is further configured to determine a type of video movement of the video from among one of a parallel movement, a rotation movement, and a central movement and generate the at least one previous frame based on the determined type of video movement.

11. The display apparatus of claim 10, wherein the image generator is further configured to determine the second area based on the determined type of video movement and the motion vector.

12. The display apparatus of claim 9, wherein the image generator is further configured to generate at least one image based on voice data comprised in the video, and
    the auxiliary image output unit is further configured to output the at least one image to the second area.

13. The display apparatus of claim 12, wherein the image generator comprises a spectrum analysis module configured to analyze a spectrum of the voice data and generate the at least one image based on at least one of a beat, a minimum volume, a maximum volume, a left volume, and a right volume of the voice data, which are comprised in the analyzed spectrum of the voice data.

14. The display apparatus of claim 9, wherein the image generator comprises an object recognition module configured to recognize an image object comprised in the video and, if the image object moves out of the first area, generates the at least one image comprising the image object.

15. The display apparatus of claim 14, wherein the object recognition module recognizes the image object by using metadata comprised in the video.

16. The display apparatus of claim 9, wherein the second area is a part of the screen of the display apparatus.

17. A non-transitory computer-readable recording storage medium having recorded stored thereon a program, which, when executed by a computer, performs a method of displaying an image, the method comprising:
 outputting a video to a first area of a screen of a display apparatus;
 detecting a motion vector of a current frame of the video;
 generating at least one previous frame of the current frame based on the motion vector, and information comprised in the video; and
 outputting the at least one previous frame to a second area surrounding the first area,
 wherein the outputting the at least one previous frame includes displaying the at least one previous frame at a position determined based on the motion vector, and
 wherein a number of the at least one previous frame is determined based on a size of the motion vector.

18. A method of displaying a video, the method comprising:
 outputting a current frame of the video to a first area;
 determining a motion vector based on the current frame and at least one previous frame of the current frame;
 determining a number of the at least one previous frame to be output to a second area, based on a size of the motion vector; and
 displaying the at least one previous frame at a position determined based on the motion vector, a portion of the at least one previous frame that overlaps the current frame being masked,
 wherein the position is outside the first area.

* * * * *